United States Patent
Chetlur et al.

(10) Patent No.: US 9,439,093 B2
(45) Date of Patent: *Sep. 6, 2016

(54) ESTIMATING AVAILABLE BANDWIDTH IN CELLULAR NETWORKS

(71) Applicant: International Business Machines Corporation, Armonk, NY (US)

(72) Inventors: Malolan Chetlur, Bangalore (IN); Umamaheswari C. Devi, Bangalore (IN); Ravindranath Kokku, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,785

(22) Filed: Dec. 28, 2015

(65) Prior Publication Data
US 2016/0112891 A1    Apr. 21, 2016

Related U.S. Application Data

(63) Continuation of application No. 13/688,723, filed on Nov. 29, 2012, now Pat. No. 9,231,843.

(51) Int. Cl.
*H04L 12/26*    (2006.01)
*H04W 24/08*    (2009.01)

(52) U.S. Cl.
CPC .......... *H04W 24/08* (2013.01); *H04L 43/0882* (2013.01); *H04L 43/0888* (2013.01); *H04L 43/0894* (2013.01); *H04L 43/10* (2013.01); *H04L 43/103* (2013.01)

(58) Field of Classification Search
CPC ............ H04L 43/103; H04L 43/0882; H04L 43/0888; H04L 43/0894
See application file for complete search history.

(56) References Cited

U.S. PATENT DOCUMENTS

| | | | |
|---|---|---|---|
| 7,130,268 B2 | 10/2006 | Mascolo | |
| 7,315,514 B2 | 1/2008 | Heiner et al. | |
| 7,436,772 B2 | 10/2008 | Padhye et al. | |
| 7,768,910 B2 * | 8/2010 | Neidhardt | H04L 12/5695 370/230 |
| 7,813,351 B2 | 10/2010 | Shriram et al. | |

(Continued)

FOREIGN PATENT DOCUMENTS

| | | |
|---|---|---|
| CN | 101026509 A | 8/2007 |
| CN | 101222381 A | 7/2008 |

(Continued)

OTHER PUBLICATIONS

Hartikainen et al, "Tuning the Temporal Charachteristics of a KALMAN-Filter Method for End to End Bandwidth Estimation", 2006, IEEE.*

(Continued)

*Primary Examiner* — Omer S Mian
(74) *Attorney, Agent, or Firm* — Ference & Associates LLC

(57) ABSTRACT

Systems and methods for estimating bandwidth. A first probe flow is sent into cellular traffic, and a first bandwidth quantity achieved by the first probe flow is measured. A second probe flow is sent into the cellular traffic, and a second bandwidth quantity achieved by the first probe flow while the second probe flow is in the cellular traffic is measured. The first bandwidth quantity and the second bandwidth quantity are compared, and at least one result from the comparing is determined.

13 Claims, 7 Drawing Sheets

(56) References Cited

U.S. PATENT DOCUMENTS

| | | | |
|---|---|---|---|
| 7,965,644 B2 | 6/2011 | Chang et al. | |
| 2003/0039233 A1 | 2/2003 | Satt et al. | |
| 2003/0235209 A1* | 12/2003 | Garg | H04L 12/4675 370/468 |
| 2004/0008627 A1* | 1/2004 | Garg | H04L 12/5695 370/235 |
| 2005/0100009 A1* | 5/2005 | Botvich | H04L 41/0896 370/389 |
| 2006/0215574 A1 | 9/2006 | Padmanabhan et al. | |
| 2007/0070894 A1* | 3/2007 | Wang | H04W 72/1242 370/230 |
| 2007/0115849 A1* | 5/2007 | Ekelin | H04L 12/2697 370/252 |
| 2007/0217448 A1* | 9/2007 | Luo | H04L 47/10 370/468 |
| 2007/0223529 A1 | 9/2007 | Lee et al. | |
| 2009/0164657 A1* | 6/2009 | Li | H04L 41/0896 709/233 |
| 2009/0262657 A1* | 10/2009 | Ekelin | H04L 41/0896 370/252 |
| 2009/0320077 A1* | 12/2009 | Gazdzinski | H04N 7/17318 725/62 |
| 2010/0110922 A1 | 5/2010 | Ketheesan et al. | |
| 2010/0157825 A1 | 6/2010 | Anderlind et al. | |
| 2010/0271962 A1 | 10/2010 | Han et al. | |
| 2011/0007631 A1* | 1/2011 | Raina | H04L 45/00 370/230 |
| 2011/0090811 A1* | 4/2011 | Ekelin | H04L 12/2697 370/252 |
| 2011/0116367 A1 | 5/2011 | Mang et al. | |
| 2012/0047379 A1* | 2/2012 | Chen | G06F 1/3212 713/320 |
| 2013/0136004 A1 | 5/2013 | Torres et al. | |

FOREIGN PATENT DOCUMENTS

| | | |
|---|---|---|
| CN | 201146527 Y | 11/2008 |
| WO | WO2009118602 A2 | 10/2009 |

OTHER PUBLICATIONS

Ekelin et al, "Real-Time Measurmeent of End to End Available Bandwidth using Kalman Filtering", 2008, IEEE.*
Ekelin et al, "Continuous Monitoring of Available Bandwidth over a Network Path", 2004, SNCNW.*
International Search Report for Application No. PCT/IB2013/060313, May 26, 2014, 2 pages, State Intellectual Property Office of the P.R. China, Beijing, China.
Capone, Antonio et al., "Bandwith Estimation Schemes for TCP over Wireless Networks," IEEE Transactions on Mobile Computing, Apr.-Jun. 2004, pp. 1-15, vol. 3, No. 2, IEEE CS, CASS, ComSoc, IES, & SPS, Washington, DC, USA.
Monroy, Marco Aurelio Alzate, "End-to-End Available Bandwidth Estimation in IEEE 802.11B Ad Hoc Networks," Doctoral Thesis, Dec. 15, 2008, 121 pages, Universidad de los Andes, School of Engineering, Department of Electrical and Electronic Engineering, Bogota, Columbia.
ip.com, "Method for Improved Active Estimation of Available Bandwidth of Network Paths Using Kalman Filters," Prior Art Database Disclosure, Jun. 5, 2008, 1 page. Copy can be found at http://ip.com/IPCOM/000171336 as of Oct. 5, 2012.
Prasad, Ravi et al., "Bandwidth Estimation: Metrics, Measurement Techniques, and Tools," IEEE Network, Nov./Dec. 2003, pp. 27-35, IEEE, Washington, DC, USA.
Lakshminarayanan, Karthik et al., "Bandwidth Estimation in Broadband Access Networks," IMC '04, Oct. 25-27, 2004, Taormina, Sicily, Italy, pp. 314-321, ACM Digital Library.
Claypool, Mark et al., "Characterization by Measurement of a CDMA 1x EVDO Network," WiCon '06, Aug. 2-5, 2006, Boston, Massachusetts, USA, 8 pages, ACM Digital Library.
Koutsonikolas, Dimitrios et al., "On the feasibility of bandwidth estimation in wireless access networks," Wireless Netw, Jul. 7, 2011, pp. 1561-1580, vol. 17, Springer Science and Business Media, LLC, New York, New York, USA.
Jain, Manish et al., "End-to-End Available Bandwidth: Measurement Methodology, Dynamics, and Relation with TCP Throughput," SIGCOMM '02, Pittsburgh, Pennsylvania, USA, Aug. 19-23, 2002, 14 pages, ACM Digital Library.
Ekelin, Svante et al., "Continuous Monitoring of Available Bandwidth over a Network Path", 2004, SNCNW, 5 pages.
Ekelin, Svante et al., "Real-Time Measurement of End-to-End Available Bandwidth using Kalman Filtering", 2008, IEEE, 12 pages, IEEE Digital Library.
Hartikainen, Erik et al., "Tuning the Temporal Characteristics of a Kalman-Filter Method for End-to-End Bandwidth Estimation", 2006, IEEE, 8 pages, IEEE Digital Library.

* cited by examiner

ESTIMATING AVAILABLE BANDWIDTH IN CELLULAR NETWORKS

CROSS REFERENCE TO RELATED APPLICATIONS

This application is a continuation application of U.S. patent application Ser. No. 13/688,723, filed on Nov. 29, 2012, and entitled "ESTIMATING AVAILABLE BANDWIDTH IN CELLULAR NETWORKS," the contents of which are incorporated by reference herein.

BACKGROUND

Recently, as cell phone usage on 3G and 4G broadband cellular networks has increased, so too has the average traffic per user and users' expectations of quality of experience (QoE). Operational costs for the cellular network operators are also increasing. Meanwhile, the average revenue per user (ARPU) is decreasing. Because of these trends, network operators have sought techniques to optimize the user's experience and offset costs. To date, such techniques have not proven wholly effective.

BRIEF SUMMARY

In summary, one aspect of the invention provides a method of estimating bandwidth, the method comprising: utilizing a processor to execute computer code configured to perform the steps of: sending a first probe flow into cellular traffic; measuring a first bandwidth quantity achieved by the first probe flow; sending a second probe flow into the cellular traffic; measuring a second bandwidth quantity achieved by the first probe flow while the second probe flow is in the cellular traffic; comparing the first bandwidth quantity and the second bandwidth quantity; and determining at least one result from the comparing.

Another aspect of the invention provides an apparatus for estimating bandwidth, the apparatus comprising: at least one processor; and a computer readable storage medium having computer readable program code embodied therewith and executable by the at least one processor, the computer readable program code comprising: computer readable program code configured to send a first probe flow into cellular traffic; computer readable program code configured to measure a first bandwidth quantity achieved by the first probe flow; computer readable program code configured to send a second probe flow into the cellular traffic; computer readable program code configured to measure a second bandwidth quantity achieved by the first probe flow while the second probe flow is in the cellular traffic; computer readable program code configured to compare the first bandwidth quantity and the second bandwidth quantity; and computer readable program code configured to determine at least one result from the comparing.

An additional aspect of the invention provides a computer program product for estimating bandwidth, the computer program product comprising: a computer readable storage medium having computer readable program code embodied therewith, the computer readable program code comprising: computer readable program code configured to send a first probe flow into cellular traffic; computer readable program code configured to measure a first bandwidth quantity achieved by the first probe flow; computer readable program code configured to send a second probe flow into the cellular traffic; computer readable program code configured to measure a second bandwidth quantity achieved by the first probe flow while the second probe flow is in the cellular traffic; computer readable program code configured to compare the first bandwidth quantity and the second bandwidth quantity; and computer readable program code configured to determine at least one result from the comparing.

A further aspect of the invention provides a method comprising: sending a first probe flow into current cellular traffic; sending a second probe flow into current cellular traffic; measuring a bandwidth alteration experienced when the first probe flow and the second probe flow are both in the current cellular traffic; and ascertaining a quantitative effect of the bandwidth alteration on the current cellular traffic.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1A:
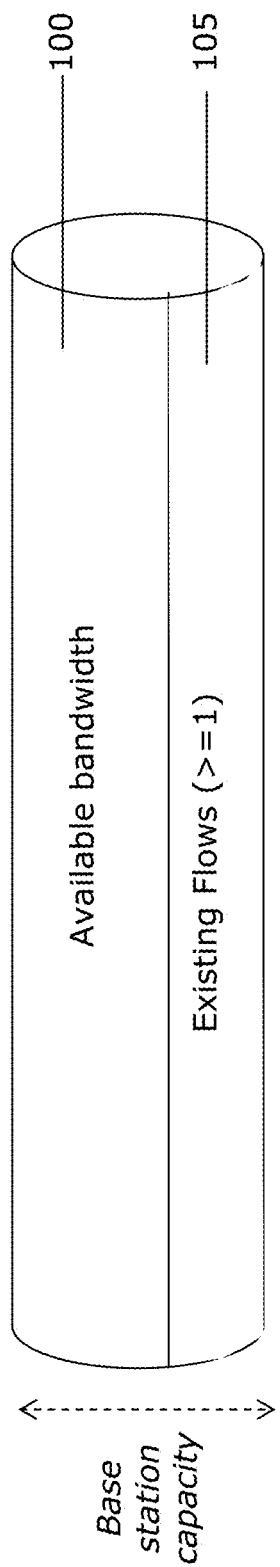
FIG. 1A illustrates an example according to one embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are described to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

Generally, it is recognized that a large number of mobile Internet applications such as email, social networking (e.g., "Facebook" and "Google+", as trademarked and/or registered), news aggregators (e.g., "Pulse", "Google Reader", as trademarked and/or registered), media sharing (e.g., "Picasa", "Pinterest", "Soundcloud", as trademarked and/or registered), and cloud storage (e.g., "iCloud", "Ubuntu One", as trademarked and/or registered), involve data transfers that humans are not continuously waiting for. Communication of such delay-tolerant data can be deferred up to a point without adversely affecting the mobile users' Quality of Experience (QoE). Similarly, in the case of on-demand media streaming applications such as podcasts and buffered video playback, data can be opportunistically prefetched so that it is available for user consumption at the most appropriate time.

Given this flexibility of deciding when to transfer certain kinds of data to and from a mobile device, opportunistic communication of such delay tolerant content when the spare capacity in the network is high has the benefits of greater energy efficiency on mobile devices and improved user QoE. Firstly, prior research on energy-aware cellular data scheduling has shown that energy efficiency can be significantly improved by scheduling data transfers to and from mobile devices when the wireless channel quality as well as the communication bandwidth are high. Secondly, scheduling such non-real-time traffic (background flows) when the spare capacity is high helps avoid destructive interference with other real-time traffic (foreground flows or cross flows) on the same and other mobile devices, thus improving the user QoE.

An important building block in cellular data scheduling that can enable such opportunistic communication is on-demand estimation of Available Bandwidth (AB), i.e., spare capacity.

Conventional techniques addressing QoE management in cellular networks are often reactive in nature (i.e., arise merely in response to problems as they develop) and have proven to be highly ineffective for purposes such as those discussed herein. Thus, proactive techniques that use predictive network analytics to drive QoE management based upon the anticipated future state of the network are being developed. Examples of such techniques include: dynamic service recognition for short periods; asynchronous delivery of delay tolerant content; congestion based policy control; and enhanced middleware capable of making intelligent decisions about bandwidth allocation.

Predicting a future state also entails measuring and recording a current state of the network. An important component of the network state is the spare capacity at a cellular base station (BS) that can be put to use without adversely impacting the flows existing at the BS. Such spare capacity is also referred to as the available bandwidth (AB). Generally, there is broadly contemplated herein, in accordance with at least one embodiment, a technique for determining AB at cellular BSs when such information is not exposed by the network elements such as BSs. As such, the disclosure now briefly turns to a discussion of some existing techniques and their shortcomings, as well as a discussion of some general considerations relating to data packet scheduling.

Weighted fair queuing (WFQ) is a data packet scheduling technique permitting an assignment of different scheduling priorities to statistically multiplexed data flows (reference herein to "flows" or "data flows" can be considered to be interchangeable). WFQ is a type of fair queuing (FQ). In WFQ and FQ, each flow has a separate FIFO (first-in, first-out) queue. Using FQ, assuming a link rate R and N active flows, the N flows are serviced at the same time, each receiving a data rate of R/N. With each flow having its own FIFO queue, no single flow can affect other flows in session. In contrast, WFQ permits individual flows to achieve different shares of the total bandwidth. In this case, if N flows are in session (i.e., active), with each having weights w1, w2... wN, flow $f_i$ will achieve an average data rate of $R \times w_i/(w1+w2+ \ldots +wN)$. By actively controlling the WFQ weights, the QoE can be met for bandwidth needs and/or data flow rate.

In Proportional Fairness (PF) scheduling, the weights of the flows are each set to $w_i=1/c_i$ where $c_i$ is the cost per data bit of flow $f_i$. $C_i$ may be the number of base stations in proximity that cannot use the same channel in order to avoid co-channel interference, the air time required to transmit a certain number of bits at the current SNR (signal to noise ratio) for the flow, or the required interference (energy) level.

3G base stations use some variant of (PF) scheduling, which is a variant of WFQ. This technique allocates resources (e.g., air time at a BS) fairly among the existing flows resulting in "flow isolation". Flow isolation describes the situation whereby one flow with the highest priority rate is prevented from taking bandwidth from existing flows. In order to achieve flow isolation, a separate queue is used for each flow's packets by the PF scheduler. In contrast, in FIFO scheduling, wherein all the flows share a single queue and packet priority is given by packet arrival time, a flow can misbehave and hog network resources and increase delays and losses for other flows by transmitting at a high rate. With flow isolation, each flow receives its fair share and cannot lose that share to a higher priority or misbehaving flow.

Active probing techniques for estimating available bandwidth involve determining the impact of cross traffic on one or more probe flows. For instance, pathLoad (described in M. Jain and C. Dovrolis, "End-to-End Available Bandwidth: Measurement Methodology, Dynamics, and Relation with TCP Throughput", IEEE/ACM Transactions on Networking, 11(4): 537-549, August 2003) relies on the increasing trend in one-way delays (OWD) experienced by packets of a probe stream, when the stream rate is larger than the available bandwidth. However, since the PF scheduler at the cellular base station allocates resources fairly among the existing flows, thus providing flow isolation, the cross traffic cannot impact the probe flow until the probe flow receives its fair share of the bandwidth. In other words, if available bandwidth is less than the fair share due to a new flow, the probe stream would not experience adverse effects such as increasing one-way delays or packet losses until the probe rate is at least its fair share. Thus, it is not possible to determine whether the bandwidth that a probe flow achieves is the available bandwidth or its fair share using existing techniques.

For an illustration of why existing FIFO-based techniques cannot be applied to cellular networks with PF scheduling at the base stations, the following example can be considered. Let C the total bandwidth capacity by 10 Mbps; let the number of flows n=1; let the rate of the single flow be 8 Mbps. In this case, the available bandwidth AB=2 Mbps. Here, under PF scheduling, a second flow can receive a bandwidth of up to 5 Mbps, which is its fair share and not AB. The problem is that existing FIFO-based techniques would incorrectly estimate this fair share as the available bandwidth, and not the actual available bandwidth of 2 Mbps.

An estimation technique developed specifically for wireless routers is the conventional "probe gap model" (PGM) for 802.11-based wireless local-area networks (LANs) with contention based distributed MAC scheduling (for uplink). PGM analyzes the OWDs of Poisson-spaced probes to estimate the fraction of time the channel is idle. PGM can work well in WLANs owing to a wide difference in latency experienced by packets during idle and contention periods (due to the use of exponential backoff). (Exponential backoff is used in some computer networks to slow down or space out repeated transmissions of the same block of data packets to prevent network congestion. Essentially, the flow rate is decreased until an acceptable rate is found given the current conditions.) However, PGM overestimates the AB in PF-scheduled cellular networks consistently as the PF scheduler ensures that the queuing delay of probe packets do not differ significantly from that of the foreground flows. Therefore, the OWD of probe packets do not differ significantly under different load conditions leading to wrong AB estimates.

In view of the shortcomings presented by conventional techniques, there are broadly contemplated herein, in accordance with at least one embodiment of the invention, methods and arrangements for determining spare capacity available in a wireless downlink of a cellular network without impacting the service provided to any flow already in session. In turn, determination of the available bandwidth can be accomplished by directing two probe flows into base station traffic in two stages. A first probe flow may be directed into the base station traffic in the first stage, followed by one additional probe flow in the second stage. The achieved bandwidth of each of the respective probe flows can then be used to calculate, in realtime, available bandwidth at the base station.

Figure 1B:
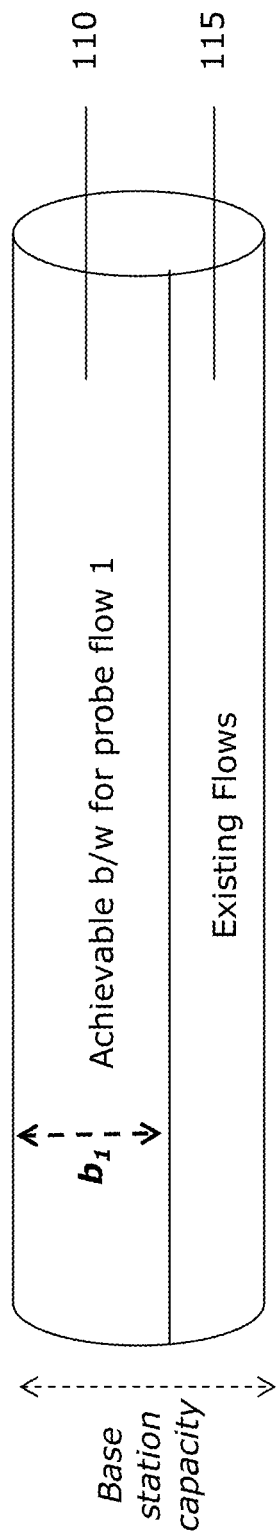
FIG. 1B illustrates an example according to one embodiment.
Figure 1C:
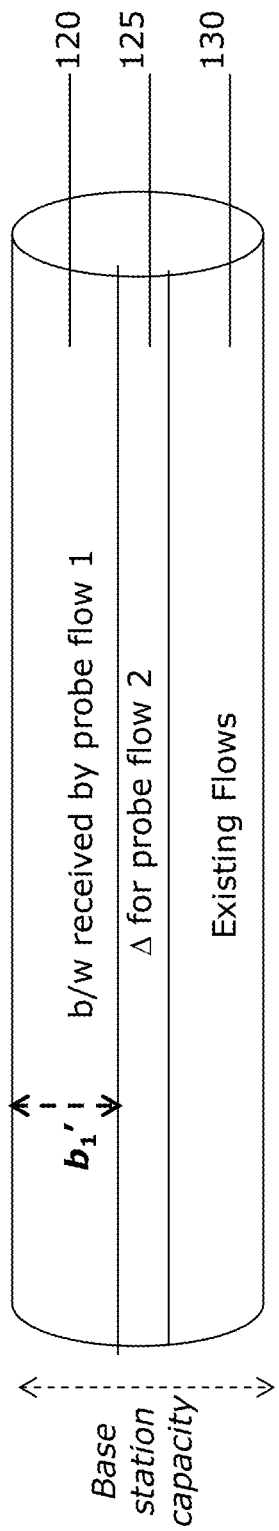
FIG. 1C illustrates an example according to one embodiment.

Turning now to FIGS. 1A-C, a non-limiting example, in accordance with at least one embodiment of the invention, is depicted. All three figures may be referred to simultaneously. Generally, as shown in FIG. 1A, the entire base station capacity for bandwidth comprises available bandwidth (100) plus existing flows greater than or equal to 1 (105). As shown at 110 in FIG. 1B, $b_1$ represents the bandwidth that could accordingly be achieved for a first probe flow (probe flow 1), inasmuch as existing flows at the Base Station are indicated at 115. At 120 in FIG. 1C, then, a second probe flow (probe flow 2) has been directed into the traffic at rate $\Delta$ as depicted at 125 and $b_1$ is the bandwidth achieved by the first probe flow. At 130, it may be seen that the existing flows have not been affected by directing a first and second probe flow into the traffic at the base station. Particularly, inasmuch as the bandwidth achieved by the first probe flow plus the bandwidth achieved by the second probe flow represents the extant excess bandwidth of the base station, the existing flows continue to operate and are not impacted by the first and second probe flows.

Figure 2:
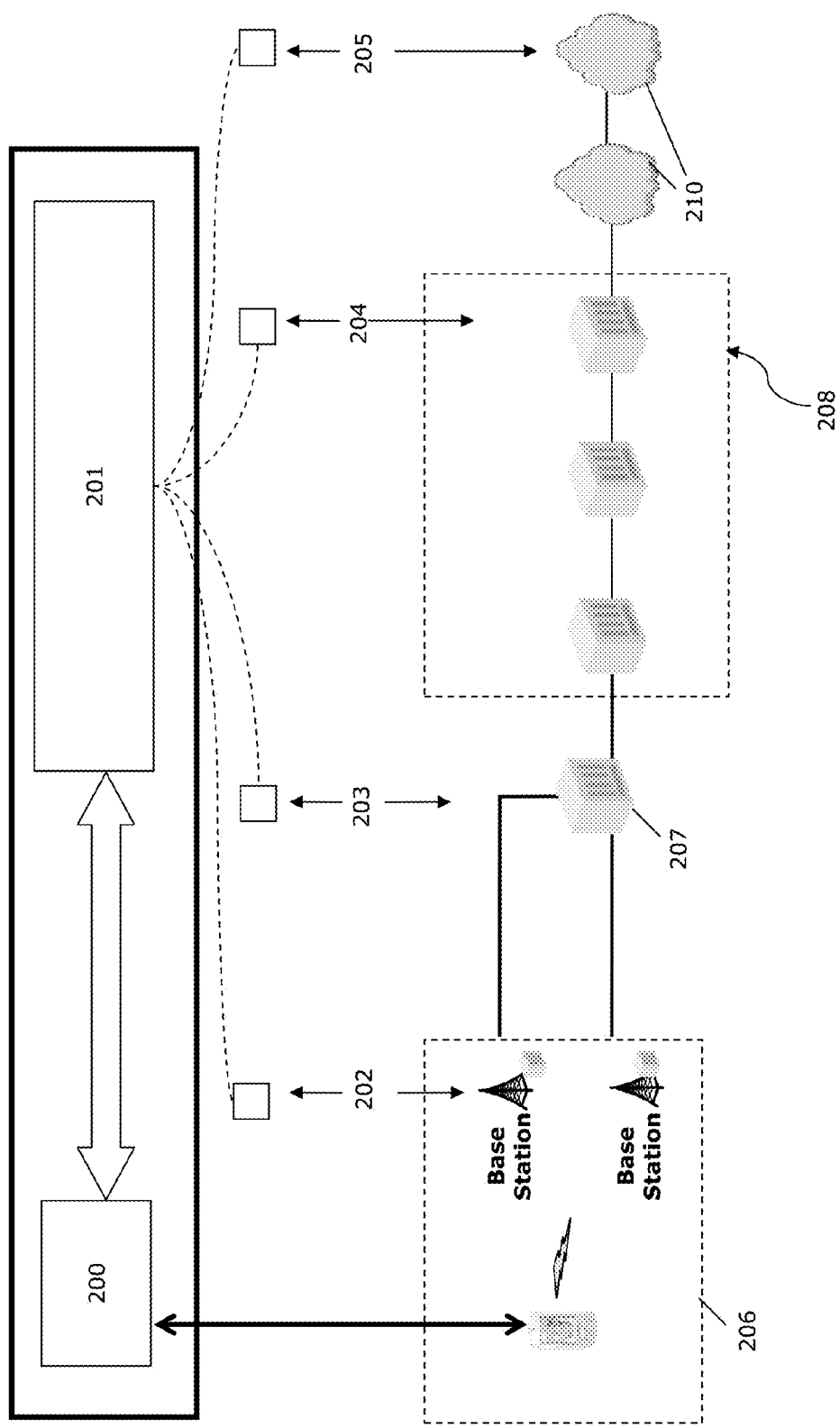
FIG. 2 illustrates an example embodiment.

Turning now to FIG. 2, a non-limiting example in accordance with at least one embodiment of the invention is seen. Indicated at 200 is an estimation receiver capable of calculating, in realtime, bandwidth received by a probe flow injected into the current base station cross traffic. Estimation receiver 200 may be deployed in software or hardware, or in a combination of the two, and on any mobile computing device that may be connected to a cellular network. Such a mobile computing device may be any 3G or 4G capable device, for example, a mobile phone, a smart phone, or a lap top.

In accordance with at least one embodiment of the invention, an estimation sender 201 is provided, and it may be deployed at various locations within the cellular network. In other words, transmissions (e.g., data packets) sent by sender 201 may be transmitted from various locations. As such, sender 201 may be deployed (202) at a base station of a cellular network 206, at (203) a backhaul and radio network controller 207, at (204) a core network 208, and/or at (205) any place in the internet 210 between the cellular network and one or more internet locations.

In accordance with a method for calculating available bandwidth according to at least one embodiment of the invention, a first probe flow is sent through a link of interest and the bandwidth $b_1$ achieved by it is measured. A second probe flow is then sent through the link of interest whereby the associated additional flow is transmitted at rate $\Delta \ll b_1/2$. The bandwidth $b_1\square$ achieved by the first probe flow in the presence of the second probe flow is then measured. If $b_1 \geq b_1\square + \Delta - \epsilon$, wherein $\epsilon$ corresponds to a safe "cushion" for accommodating the second probe flow then the available bandwidth (AB) is represented by $b_1$. By way of an illustrative example, a "safe" value for $\epsilon$ is $\Delta/3$. Otherwise, it can be appreciated that available bandwidth is not known. Achievable bandwidth (e.g., bandwidth achieved by probe flow 1) can be determined using known techniques associated with FIFO or by computing the dispersion of a train of back-to-back packets transmitted at intervals of approximately 30 seconds.

In accordance with at least one embodiment of the invention, a probe flow can be sent from any node such that the link of interest (the wireless link) represents both a bottleneck (tight, narrow) link in the path from the source to the destination. In addition, the two probe flows should be directed to devices with more or less similar channel conditions.

In accordance with at least one embodiment of the invention, available bandwidth can be estimated in a context of differences in channel quality. An approach according to at least one embodiment of the invention can be applicable as long as the two probe flows see similar channel conditions. As such, in view of cross traffic or other influences, existing flows may experience different channel conditions at different times.

In accordance with at least one embodiment of the invention, it can be recognized that when the number of priority classes is one, since the total bandwidth is dependent on the channel qualities of the sessions in progress, the weights (of the priorities) can be used by the scheduler to allocate the total spectrum resources (that is, air time) across sessions, as opposed to the base station bandwidth. In that case, the bandwidth that a given session receives would be dependent on its channel quality. However, when there are multiple priority classes such as UGS, rtPS, BE, and others, embodiments of the invention can be applied if the flows in the lowest priority class are scheduled in a PF manner. If the lowest priority flows are scheduled in a FIFO manner, any of the techniques proposed for FIFO networks may be used. It can thereby be appreciated that having the destination devices (for the probe flows) in a controlled environment ensures similar channel conditions. It will also be understood that since available bandwidth would be determined with respect to the received signal strength indication (RSSI) of the destination device, bandwidth should be scaled appropriately for destinations with different RSSIs.

Figure 3A:
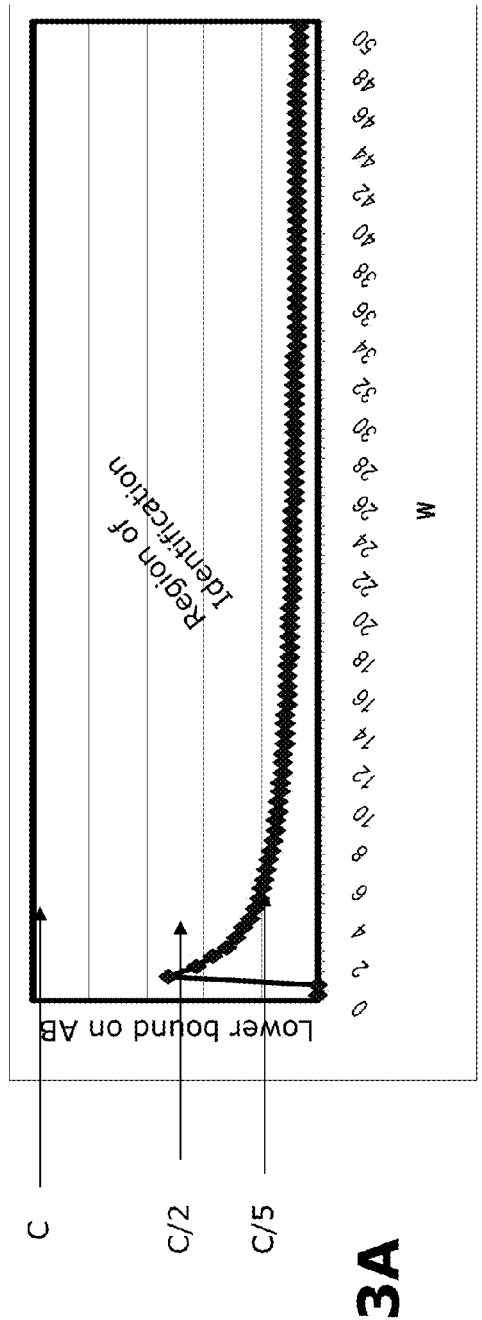
FIG. 3A is a plot of a lower bound on available bandwidth.
Figure 3B:
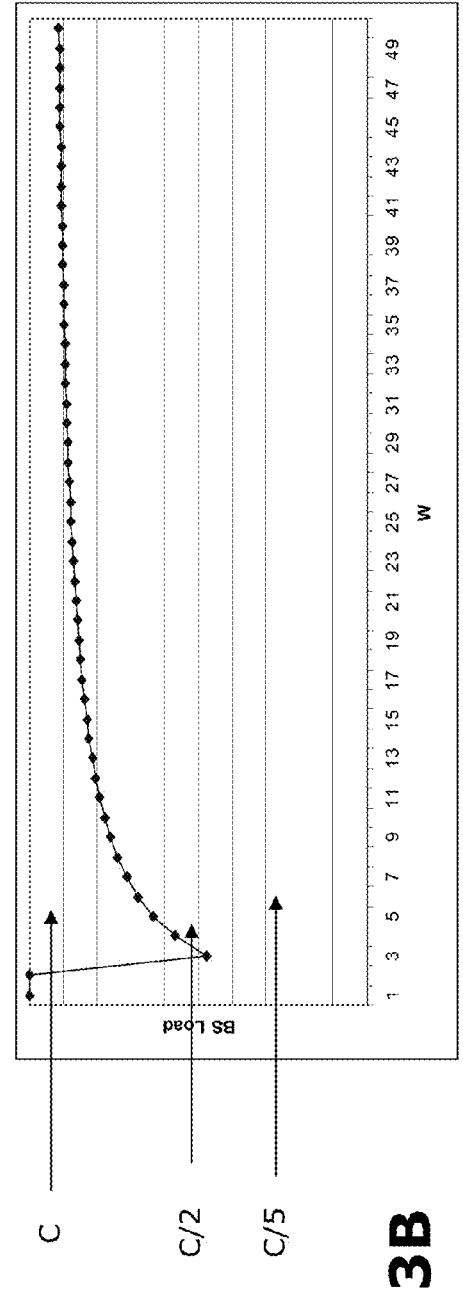
FIG. 3B is a plot of an upper bound on the load on a base station (BS) for available bandwidth to be detectable.

Referring now to FIGS. 3A-B, in accordance with at least one embodiment of the invention, methods for calculating bandwidth may be applied when: C is the base station capacity in Mbps; n is the number of existing flows; W is the cumulative weight of the n existing flows relative to that of the first probe flow $f_1$ (in the presence of the second probe flow); available bandwidth can be determined if n=0 or W<1.0 or the weight of each flow is less than 1.0 or AB≥(C+WΔ)/(W+1), or equivalently, for any k flows with the highest rate, AB≥(C−sum of rates of remaining flows+$W_k$Δ)/($W_k$+1), where $W_k$=cumulative weight of the k flows relative to that of f1.

In one non-limiting example the following problem may be solved. Let 2 flows be in session at a base station, each receiving a throughput of 1 Mbps. Let the available bandwidth at the base station for a flow to device D at its channel quality (CQ) be 1 Mbps. Let the CQI (channel quality indicator) for this device be roughly half of that of the other flows (such that the base station is 50% utilized). In this case, the achievable bandwidth for D is 1 Mbps. Now, start a fourth flow at the rate of Δ=0.3 Mbps. In the presence of the fourth flow, throughput received by device D would be (4−2×0.3−2×1)/2=0.7 Mbps and (0.7)+0.3=1.0, hence available bandwidth can be estimated correctly.

In another non-limiting example, let the 2 flows in session be at the rate of 1.5 Mbps. The available bandwidth for device D (at the same CQI as the first example) is 0.5 Mbps. The achievable throughput for D=(1.5×2+2×0.5)/(3×2)=4/6=0.667 Mbps. Now, start the fourth flow at the rate of Δ=0.3 Mbps. In the presence of the fourth flow, throughput received by device D would be (4−2×0.3)/(3×2)=3.4/(3×2)=0.57 Mbps and (0.3)+0.57>0.667, hence available bandwidth cannot be correctly estimated.

Accordingly, some embodiments address a situation where the channel experienced by the cross traffic flows and/or their load changes from the first step of the estimation process to the second step of the process. In such a case, the net effect of all the changes experienced by the cross flows, including arrival of new flows and departure of existing flows, would be an increase or decrease in the total cross traffic. Some embodiments provide that under such fluctuating conditions, available bandwidth may be estimated by determining the bounds on the net change as provided in the following non-limiting example.

STEP 1: Determine b1 and b1' as in the original approach (using one and two probe flows, respectively).

STEP 2: If (b1==b1') then AB is not known. GOTO STEP 5.

STEP 3: If (Δ−(b1−b1'))/(b1−b1')≥1, then AB is not known. GOTO STEP 5.

STEP 4: If 0≤(Δ−(b1−b1'))/(b1−b1')<1, then AB=b1. GOTO STEP 5.

STEP 5: Compute 2×(b1'−b1)+Δ and (b1'−b1)+Δ

2×(b1'−b1)+Δ denotes the minimum aggregate increase/decrease that should have happened to the cross traffic (depending on the sign of the computed value) for the number of cross traffic flows that were backlogged in the first step to be at least 1.

b1'−b1+Δ denotes the change that should have happened to the cross traffic if b1 were indeed the available bandwidth.

STEP 6: Let N1=|2×(b1'−b1)+Δ| and N0=|(b1'−b1)+Δ|

STEP 7: If (N0<N1−δ) or ((k×N0<N1) AND (N1−N0>ϵ)), then b1 is the AB.

STEP 8: Else if (N1<N0−δ) or ((k×N1<N0) AND (N0−N1>ϵ)), then AB is not known (there is at least one backlogged flow)

STEP 9: Else if (N0<N1), then b1 is very likely the AB

STEP 10: Else if (N1<N0), then AB is very likely not known (there is very likely at least one backlogged flow)

δ, ϵ, and k are configurable

STEP 11: Repeat the above steps (STEPS 1-10) two more times.

Determine an estimate of AB using every two consecutive measurements. With 3 rounds of measurements, the total number of measurements is 6, and the number of possible measurement pairs, and hence, the number of estimates, is 5.

With respect to the last non-limiting example, some embodiments provide that the method may be ended when two consecutive firm estimates that are the same are obtained. Some embodiments provide that if two consecutive estimates are not firm and the same, then the dominating condition may be taken as the final conclusion.

Some embodiments provide that to discount changes in channel quality over small time scales, achievable throughput should be measured over a reasonable length of time, for example 3 to 5 seconds. Some embodiments provide that a single run of estimation may be accomplished over approximately 30 seconds where probe flows are injected into the current base station traffic at the rate of one every 3-5 seconds.

In one embodiment, the following variant procedure may be used for estimating AB when the two probe flows experience different channel quality.

STEP 1: Using probe traffic, determine the achievable bandwidth b1 for a single new flow, f1, sent through the link of interest.

STEP 2: Start a second probe flow, f2, allow it to achieve its fair share of the base station capacity, and in its presence, determine the achievable bandwidth $b_1'$ for f1.

STEP 3: Using equations $C/(W+1)=b_1$ and $C/(W+2)=b_1'$, determine W. That is, $W=(2\times b1'-b1)/(b1'-b1)$.

STEP 4: If W<1, $b_1$ is the AB. Else, AB is not known.

FIGS. 3A and 3B depict the regions, referred to as region of identification, in which AB can be successfully determined by methods such as those broadly presented hereinabove in accordance with at least one embodiment of the invention. FIG. 3A shows the lower bound on AB that can be successfully determined as a function of W. AB cannot be determined if it falls below the curve in the figure. FIG. 3B shows the lower bound on the base station load. If the base station load falls above the curve, then AB cannot be determined.

Embodiments provide that the identification region (which is represented by the space above and below the graphed lines in FIG. 3A and FIG. 3B, respectively) of the 4-step illustrative method described hereabove is slightly lower than that of the original approach, but it can increase the accuracy of an estimate.

In view of the foregoing, it can be appreciated that, in contrast to the embodiments described in this disclosure, conventional methods of calculating bandwidth in a cellular network rely upon historical data as opposed to real-time data on data flows. Such passive monitoring techniques require feedback from the cellular base station. Thus, a data traffic monitor must be deployed at the base station and historical measurements of data traffic and bandwidth usage are recorded for predicting future usage requirements. Such information may not be made available by the base station. Embodiments herein thus involve an active monitoring method that may be deployed without the support and overhead of the base station operator.

Figure 4:
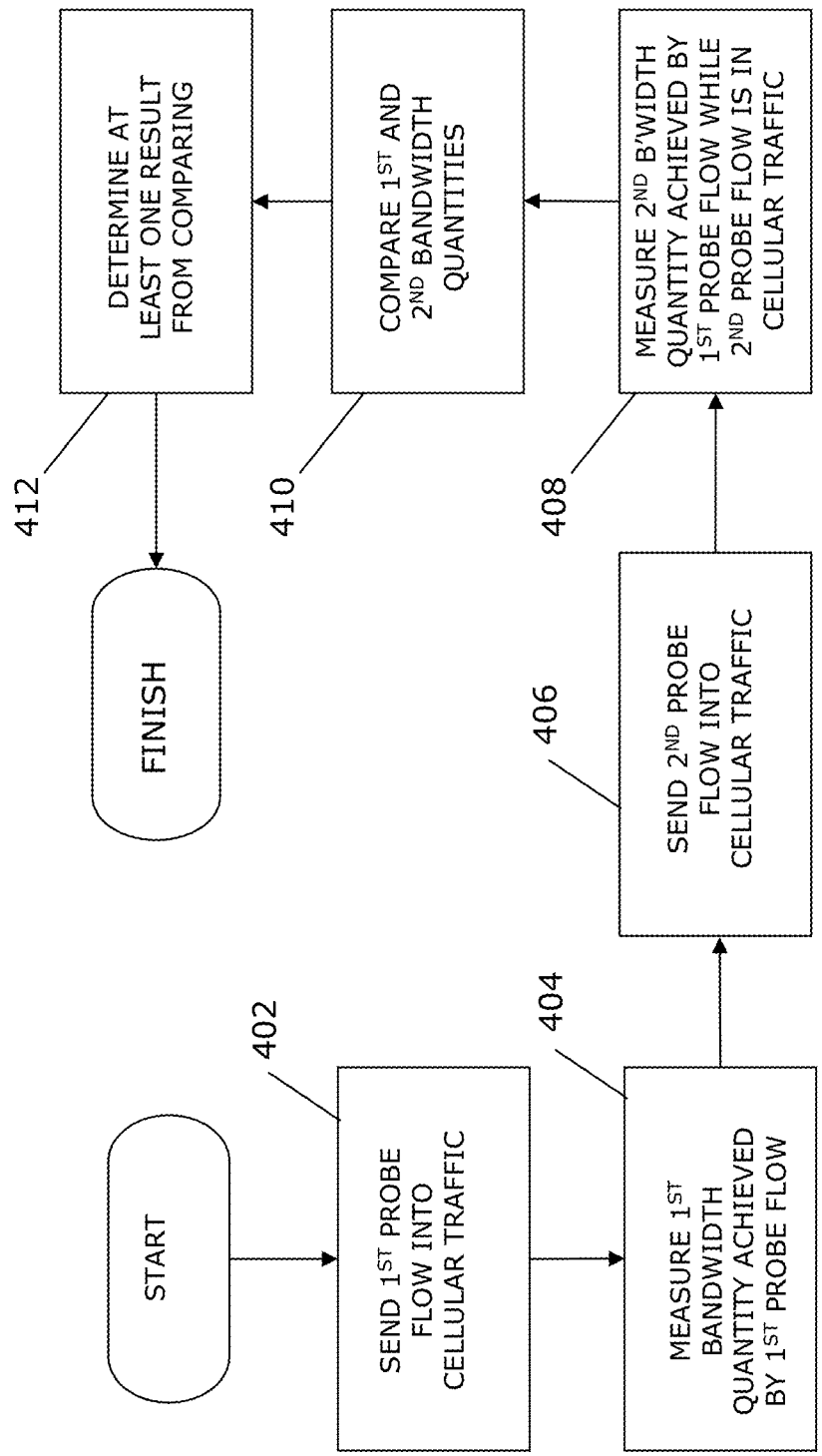
FIG. 4 sets forth a process more generally for estimating bandwidth.

FIG. 4 sets forth a process more generally for estimating bandwidth, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units.

As shown in FIG. 4, in accordance with at least one embodiment of the invention, a first probe flow is sent into cellular traffic (402), and a first bandwidth quantity achieved by the first probe flow is measured (404). A second probe flow is sent into the cellular traffic (406), and a second bandwidth quantity achieved by the first probe flow while the second probe flow is in the cellular traffic is measured (408). The first bandwidth quantity and the second bandwidth quantity are compared (410), and at least one result from the comparing is determined (412).

Figure 5:
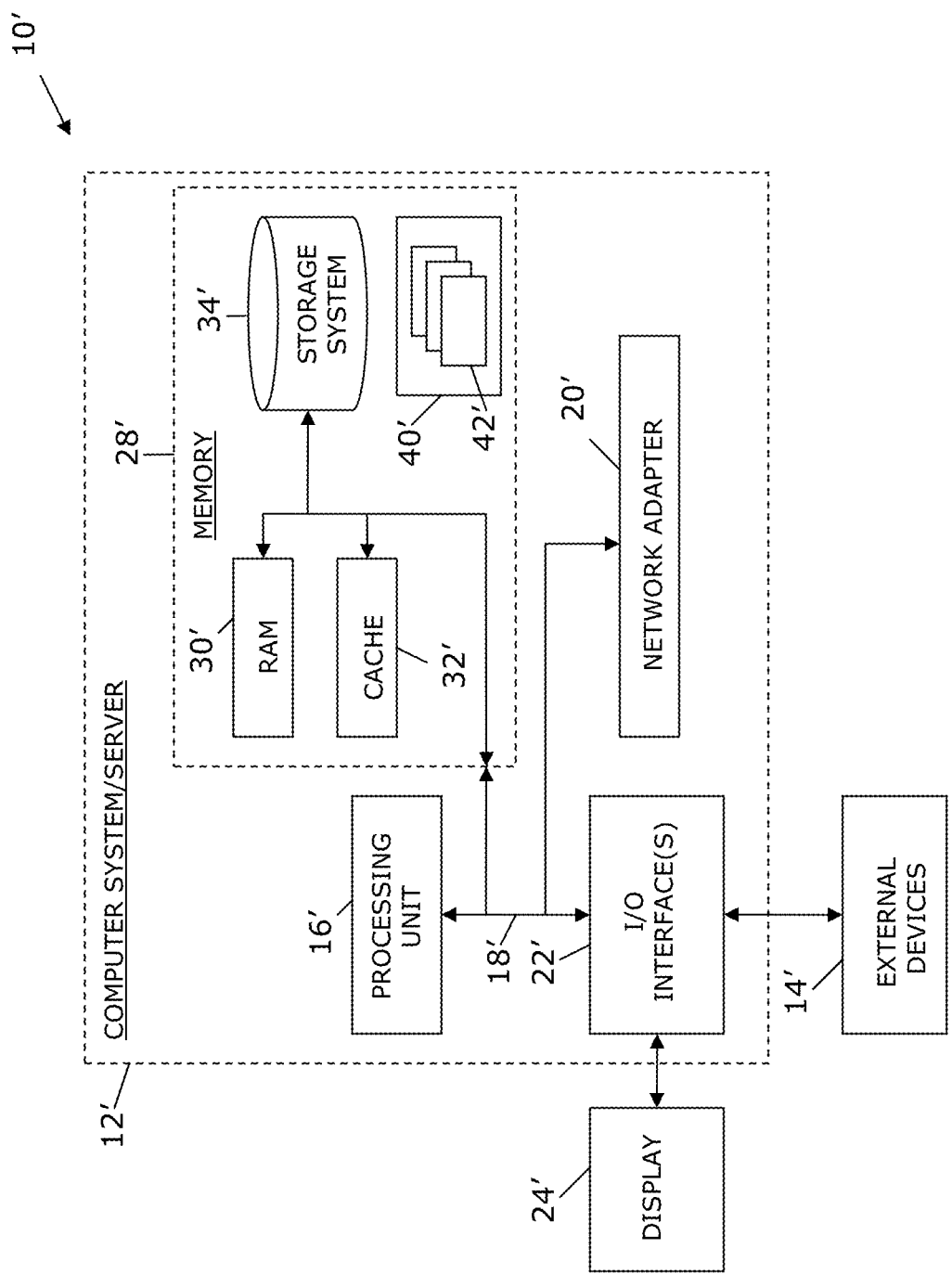
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention provided herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be provided in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are provided herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and provided in order to explain principles and practical application, and to enable others of ordinary skill in the art to understand the disclosure.

Although illustrative embodiments of the invention have been provided herein with reference to the accompanying drawings, it is to be understood that the embodiments of the invention are not limited to those precise embodiments, and that various other changes and modifications may be affected therein by one skilled in the art without departing from the scope or spirit of the disclosure.

The invention claimed is:

1. A method of estimating available bandwidth at a base station communicating a plurality of flows of cellular traffic through a communication channel, said method comprising:
the base station utilizing a processor to execute computer code configured to perform the steps of:
sending a first probe flow into the communication channel, wherein the communication channel having a capacity equal to a total bandwidth and the first probe flow comprises a first set of packets;
measuring a first bandwidth quantity, equal to a first portion of the total bandwidth, achieved by the first probe flow;
sending a second probe flow into the communication channel while the first probe flow is in the communication channel, wherein the second probe flow having a bandwidth equal to a second portion of the total bandwidth and comprises a second set of packets separate from the first set of packets;
measuring a second bandwidth quantity, the second bandwidth quantity equal to a value of the first portion of the total bandwidth achieved by the first probe flow while the first probe flow is in the communication channel during presence of the second probe flow in the communication channel;
comparing the first bandwidth quantity and the second bandwidth quantity, wherein said comparing comprises: determining whether the sum of the second bandwidth quantity and a fraction of the second portion of the total bandwidth is greater than the first bandwidth quantity or less than or equal to the first bandwidth quantity;
making a determination, based on said comparing, that the estimated available bandwidth is equal to the first bandwidth quantity and there is one or more backlogged flows at the base station;
determining a likelihood of the determination to be true by comparing a first parameter with a second parameter,
wherein the first parameter being an absolute value of a minimum aggregate change in the plurality of flows of cellular traffic based on the one or more backlogged flows being entered in the communication channel, the minimum aggregate change determined by calculating a difference value by subtracting the first bandwidth quantity from the second bandwidth quantity and adding the second portion of the total bandwidth to twice the difference value, and
wherein the second parameter being an absolute value of an expected change in load of the plurality of flows of cellular traffic based on the first bandwidth quantity being the estimated available bandwidth, the expected change calculated based on adding the second portion of the total bandwidth to the difference value;
and
performing communication through the communication channel at the base station based on the determination and the determined likelihood.

2. The method of claim 1, wherein said sending of the second probe flow comprises sending the second probe flow at a rate of $\Delta < b_1/2$, where $b_1$ represents the first bandwidth quantity and $\Delta$ represents a bandwidth attributable to the second probe flow.

3. The method of claim 1, wherein said measuring comprises measuring an achievable bandwidth using a first-in-first-out-based bandwidth estimation technique.

4. The method of claim 1, wherein said measuring comprises measuring the achievable bandwidth by computing a dispersion of a train of back-to-back packets transmitted at predetermined intervals.

5. The method of claim 1, wherein:
the cellular traffic includes solely one priority class of flow; and
said method comprises allocating available bandwidth resources based upon channel conditions for each flow in a proportional fair manner.

6. The method of claim 1, wherein:
the cellular traffic includes multiple priority classes of flow; and
said method comprises allocating available bandwidth via assigning resources to flows in the least-priority class via proportional fairness scheduling.

7. An apparatus for estimating available bandwidth at a base station communicating a plurality of flows of cellular traffic through a communication channel, said apparatus comprising:
at least one processor; and
a computer readable storage medium having computer readable program code embodied therewith and executable by the at least one processor, the computer readable program code comprising:
computer readable program code configured to send a first probe flow into the communication channel, wherein the communication channel having a capacity equal to a total bandwidth and the first probe flow comprises a first set of packets;
computer readable program code configured to measure a first bandwidth quantity, equal to a first portion of the total bandwidth, achieved by the first probe flow;
computer readable program code configured to send a second probe flow into the communication channel while the first probe flow is in the communication channel, wherein the second probe flow having a bandwidth equal to a second portion of the total bandwidth and comprises a second set of packets separate from the first set of packets;
computer readable program code configured to measure a second bandwidth quantity, the second bandwidth quantity equal to a value of the first portion of the total bandwidth achieved by the first probe flow while the first probe flow is in the communication channel during presence of the second probe flow in the communication channel;
computer readable program code configured to compare the first bandwidth quantity and the second bandwidth quantity, wherein said comparing comprises: determining whether the sum of the second bandwidth quantity and a fraction of the second portion of the total bandwidth is greater than the first bandwidth quantity or less than or equal to the first bandwidth quantity;

computer readable program code configured to make a determination, based on said comparing, that the estimated available bandwidth is equal to the first bandwidth quantity and there is one or more backlogged flows at the base station;

computer readable program code configured to determine a likelihood of the determination to be true by comparing a first parameter with a second parameter,
wherein the first parameter being an absolute value of a minimum aggregate change in the plurality of flows of cellular traffic based on the one or more backlogged flows being entered in the communication channel, the minimum aggregate change determined by calculating a difference value by subtracting the first bandwidth quantity from the second bandwidth quantity and adding the second portion of the total bandwidth to twice the difference value, and
wherein the second parameter being an absolute value of an expected change in load of the plurality of flows of cellular traffic based on the first bandwidth quantity being the estimated available bandwidth, the expected change calculated based on adding the second portion of the total bandwidth to the difference value;
and computer readable program code configured to perform communication through the communication channel at the base station based on the determination and the determined likelihood.

8. A computer program product for estimating available bandwidth at a base station communicating a plurality of flows of cellular traffic through a communication channel, said computer program product comprising:

a non-transitory computer readable storage medium having computer readable program code embodied therewith and executable by the at least one processor, the computer readable program code comprising:

computer readable program code configured to send a first probe flow into the communication channel, wherein the communication channel having a capacity equal to a total bandwidth and the first probe flow comprises a first set of packets;

computer readable program code configured to measure a first bandwidth quantity, equal to a first portion of the total bandwidth, achieved by the first probe flow;

computer readable program code configured to send a second probe flow into the communication channel while the first probe flow is in the communication channel, wherein the second probe flow having a bandwidth equal to a second portion of the total bandwidth and comprises a second set of packets separate from the first set of packets;

computer readable program code configured to measure a second bandwidth quantity, the second bandwidth quantity equal to a value of the first portion of the total bandwidth achieved by the first probe flow while the first probe flow is in the communication channel during presence of the second probe flow in the communication channel;

computer readable program code configured to compare the first bandwidth quantity and the second bandwidth quantity, wherein said comparing comprises: determining whether the sum of the second bandwidth quantity and a fraction of the second portion of the total bandwidth is greater than the first bandwidth quantity or less than or equal to the first bandwidth quantity;

computer readable program code configured to make a determination, based on said comparing, that the estimated available bandwidth is equal to the first bandwidth quantity and there is one or more backlogged flows at the base station;

computer readable program code configured to determine a likelihood of the determination to be true by comparing a first parameter with a second parameter,
wherein the first parameter being an absolute value of a minimum aggregate change in the plurality of flows of cellular traffic based on the one or more backlogged flows being entered in the communication channel, the minimum aggregate change determined by calculating a difference value by subtracting the first bandwidth quantity from the second bandwidth quantity and adding the second portion of the total bandwidth to twice the difference value, and
wherein the second parameter being an absolute value of an expected change in load of the plurality of flows of cellular traffic based on the first bandwidth quantity being the estimated available bandwidth, the expected change calculated based on adding the second portion of the total bandwidth to the difference value;
and computer readable program code configured to perform communication through the communication channel at the base station based on the determination and the determined likelihood.

9. The computer program product of claim 8, wherein said computer readable program is configured to send the second probe flow at a rate of $\Delta < b_1/2$, wherein $b_1$ represents the first bandwidth quantity and $\Delta$ represents a bandwidth attributable to the second probe flow.

10. The computer program product of claim 8, wherein said computer readable program code measures an achievable bandwidth using a first-in-first-out-based bandwidth estimation technique.

11. The computer program product of claim 8, wherein said computer readable program code measures the achievable bandwidth by computing the dispersion of a train of back-to-back packets transmitted at predetermined intervals.

12. The computer program product of claim 8, wherein:
the cellular traffic includes solely one priority class of flow; and
said computer readable program code configured to allocate available bandwidth resources based upon channel conditions for each flow via proportional fairness scheduling.

13. The computer program product of claim 8, wherein:
the cellular traffic includes multiple priority classes of flow; and
said computer readable program to allocate available bandwidth via assigning resources to flows in the least-priority class in a proportional fair manner.

* * * * *